Nov. 4, 1969  E. J. GLASSFORD  3,476,840
METHOD AND APPARATUS FOR MOLDING ARTICLES FROM THERMOPLASTIC
SHEET MATERIALS
Filed Aug. 4, 1967

INVENTOR.
Edmund J. Glassford
BY
Peter P. Kozak
ATTORNEY

United States Patent Office 3,476,840
Patented Nov. 4, 1969

3,476,840
METHOD AND APPARATUS FOR MOLDING ARTICLES FROM THERMOPLASTIC SHEET MATERIALS
Edmund J. Glassford, Livonia, Mich., assignor to General Motors Corporation, Detroit, Mich., a corporation of Delaware
Filed Aug. 4, 1967, Ser. No. 658,542
Int. Cl. B29c 3/04
U.S. Cl. 264—25                                6 Claims

ABSTRACT OF THE DISCLOSURE

Synthetic resin shapes are molded from a continuous sheet of thermoplastic synthetic resin material by feeding a continuous sheet of the resin into a furnace in which the sheet is heat softened into a pliable, moldable state and is incidentally caused to sag, and supporting the sagging portion of the sheet by means of a narrow metal band traveling beneath the sheet in the same direction and at the same rate as the sheet. The metal band is maintained at a predetermined temperature whereby the physical contact between the softened sheet and the supporting band does not mar or discolor the surface of the sheet. The softened sheet is fed directly into a molding or forming means and cooled to form molded articles.

---

This invention relates to the art of forming or molding thermoplastic resin sheet material into various shapes by first heating the sheet to a soft, pliable state, subjecting the softened sheet to a molding action such as vacuum forming, and cooling the sheet.

It is common practice to provide interior structural components of automobiles such as inner door panels, dashboard pads, and the like, with a flexible synthetic resin foam or other suitable impact absorbing layer which is covered with a color in attractive thermoplastic synthetic resin outer layer or skin. Thermoplastic synthetic resin, such as polyvinyl chloride, acrylonitrile-butadiene-styrene polymers, and the like, are commonly used in synthetic resin materials for this purpose. Frequently the skin is textured on its outer surface to simulate leather or the like.

Generally, articles such as dashboard pads and door panels are made separately and installed in the car body interior as a unit. In molding such articles the skin layer is first formed to its proper contour by first heating a sheet of the thermoplastic material to a soft, pliable state; then, while in this plastic state, molding the skin to the desired contour of the article as, for example, by vacuum forming. After cooling the sheet, the desired contour is permanently retained and the formed article is then associated with the desired underlying padding material.

It is the general object of the invention to provide an improved method and apparatus for continuously molding articles of the type described whereby a sheet of thermoplastic resin of continuous or indefinite length and of substantial width is either intermittently or continuously fed into a furnace wherein both the top and bottom portions of the sheet are radiantly heated to a desired plastic, pliable, moldable state and are then fed directly to an intermittent or continuous molding means whereby molded articles of a continuous or article type are formed from the softened sheet.

The heat softening step involves passing the continuous sheet of the thermoplastic resin material in a horizontal plane through a furnace in which it is supported at its longitudinal edges whereby the portions of the sheet intermediate the longitudinal edges sag or droop and it is a more specific object of this invention to provide means and a method for supporting the sagging portions of the heat softened sheet against excessive sagging without cutting, discoloring, or otherwise marring the molded article.

These and other objects of the invention are accomplished in a specific preferred embodiment thereof by the provision of apparatus including an elongated horizontally disposed furnace, roller means at one end thereof for feeding a continuous sheet of thermoplastic resin of substantial width horizontally through the furnace, means for movably supporting the outer longitudinal edges of the sheet horizontally as it passes through the furnace, means disposed above and below the sheet and spaced therefrom within the furnace for uniformly applying radiant heat to both the top and bottom of the sheet, a longitudinally and horizontally disposed, relatively narrow metal band disposed below the sheet intermediate the longitudinal edges thereof adapted to move at the same rate as the sheet and support the softened portions intermediate the longitudinal edges of the sheet and to prevent excessive sagging thereof, means for imparting a controlled amount of heat energy to the metal band, and a vacuum forming apparatus positioned immediately at the exit end of the furnace.

In operation of the apparatus, the thermoplastic sheet material is intermittently fed into the furnace and suitably softened therein by the radiant heating means and is supported within the furnace at its longitudinal edges and intermediate the edges by the aforesaid metal band which moves at the same rate as the thermoplastic sheet to avoid any relative movement therebetween. An important aspect of the invention involves maintaining the heat energy content of the band at a level such that the heat energy transmitted from the band to the portions of the resin sheet in contact with the band by conduction is substantially equal to the radiant heat energy shielded off by the band whereby the resin sheet is uniformly heated across its width and in the vicinity of the band whereby any discoloration or other disfiguration of the molded article is prevented. After being suitably heated in the furnace, the sheet material is intermittently fed into the vacuum forming apparatus whereby formed articles are molded in a consecutive or intermittent manner. The passage of the resin sheet through the furnace and the heating thereof is controlled so that the softened sheet may be moved into the vacuum forming apparatus in accordance with the cycle of the vacuum forming apparatus.

An important feature of the invention resides in the means provided to maintain the metal band at the appropriate energy level desired. In the preferred embodiment the band is endless in form carried by two longitudinally spaced metal pulleys positioned a suitable distance below the thermoplastic sheet within the furnace and two pulleys positioned below the furnace, one of the lower pulleys being power driven whereby the band is moved at the same linear rate as the sheet supported thereby. In accordance with the invention, that portion of the band between the two pulleys within the furnace is connected in series in an electrical circuit whereby the portion of the band contacting the resin is resistance heated to a predetermined energy level in accordance with this invention.

Other objects and advantages of this invention will be apparent from the following detailed description and the accompanying drawings in which.

Figure 1:
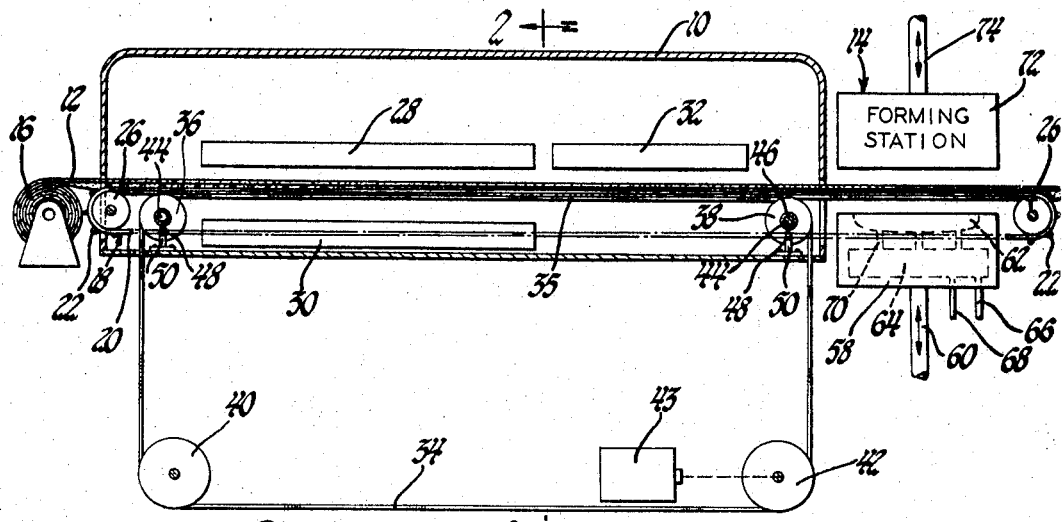
FIGURE 1 is a schematic representation of the apparatus.
Figure 2:
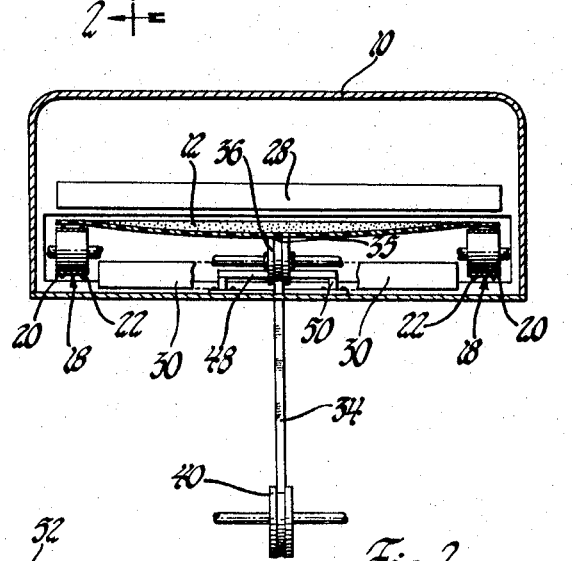
FIGURE 2 is a cross-sectional view taken along the line 2—2 of FIGURE 1.

Referring now to the drawings, and particularly to FIGURES 1 and 2, the apparatus of this invention involves an elongated furnace 10 in which a sheet of thermoplastic synthetic resin 12 is heat softened and a vacuum forming apparatus 14 in which articles are formed intermittently or consecutively as the sheet 12 passes therethrough.

The thermoplastic synthetic resin material is provided in the form of a roll 16 about 40 inches wide of a continuous sheet which is played out and carried by its longitudinal edges on a pair of spaced tracks 18 extending from one end of the furnace 10 to the outlet end of the vacuum formed apparatus 14. Preferably, the tracks 18 are in the form of an endless belt 20 having the pins 22 projecting therefrom carried on the pulleys 26 and supported on rails (not shown). The pins 22 engage or pierce the longitudinal edges of the sheet so that when the pulleys 26 are driven, the resin sheet 12 is drawn through the furnace 10 and the vacuum forming apparatus 14 with the longitudinal edges of the sheet being firmly supported and advanced through the apparatus.

Within the furnace 10 there is provided a bank of infrared heating elements 28 disposed over the path of sheet travel and spaced therefrom, and a bank of infrared heating elements 30 similarly disposed beneath the path of travel of the sheet material and spaced therefrom. The banks 28 and 30 of heat elements extend substantially across the width of the sheet, as shown in FIGURE 2, and across the major portion of the length of the sheet within the furnace, as shown in FIGURE 1. The infrared heaters 28 and 30 are preferably General Electric Calrod heaters. A third bank of heating elements 32 in the form of infrared heaters of the T3 type are disposed over the resin sheet and function to maintain the sheet in a softened condition in its travel to the vacuum forming apparatus.

Disposed beneath the sheet 12 is a relatively thin and narrow metal endless band 34 which is supported by pulleys 36 and 38 located within the furnace and a pair of lower pulleys 40 and 42 located beneath the furnace and exposed to the ambient temperature of the surrounding environment. The band 34 is an endless band preferably formed of hacksaw steel stock about 3/16 inch wide and 0.04 inch thick, which is carried by the four aforementioned pulleys. One of the pulleys 42 is connected to a motor driving means 43 whereby the band 34 may be driven at a predetermined lineal rate equal to the lineal travel rate of the track belt 20.

Figure 3:
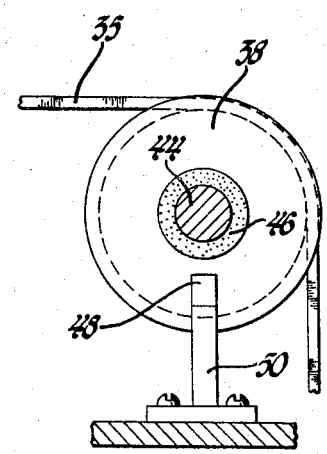
FIGURE 3 is an enlarged drawing of a pulley carrying the band and electrical connection means.
Figure 4:
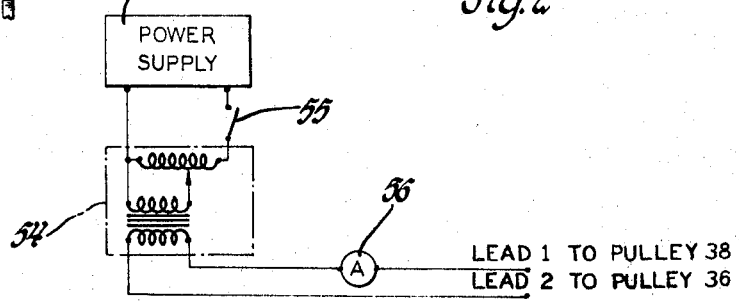
FIGURE 4 is an electrical circuit for use in heating the band carried by the pulleys of FIGURE 1.

As illustrated in FIGURE 3, the pulley 38 is carried on a shaft 44 and is electrically insulated therefrom by a bushing 46 of a suitable electrical insulating material. Each of the pulleys 36, 40, and 42 are similar in construction and insulated in a similar manner from the supporting shafts on which they rotate. The pulley 38 is electrically connected in series circuit by means of a brush contact 48 connected to lead 1, as shown in FIGURE 4, and supported by a brush holder 50. The pulley 36 is similarly connected to the lead 2, shown in FIGURE 4, by means of a brush contact, whereby the segment 35 of the band 34 within the furnace 10 between the pulleys 36 and 38 is placed in electrical circuit and resistance heated as the pulleys 36 and 38 rotate.

FIGURE 4 shows a suitable circuit for impressing an electrical current across the pulleys 36 and 38 which consists of a 110-volt power supply 52 conected to a variable voltage transformer 54 through a switch 55 which will step down the 110-volt line voltage to a voltage of about 7.5 volts across the leads 1 and 2. A suitable transformer for this purpose is a Superior type 21 Variac and an F751 Stancor transformer rated at 7.5 volts and 51 amperes. An ammeter 56 is employed to measure the current flowing through the band segment 35 whereby the heat energy level of the band segment 35 is controlled. The current is of course controlled by varying the voltage by means of the above variable voltage transformer.

Experiments have shown that even though the band is heated by the radiant heating means within the furnace, and also due to the relatively high ambient temperature within the furnace, the band is immediately quenched when it comes into contact with the relatively cool incoming sheet so that differential heating of the sheet occurs in the area of the metal band to cause the aforesaid highlighting or marking-off effect in the molded product. This situation occurs even when the band 34 is located entirely within the furnace and is subjected to the radiant heating means.

By numerous experiments it has been found that when heat energy is supplied to that portion of the band in contact with the thermoplastic sheet to appropriate levels, the shielding effect of the band is offset by the heat supplied to the adjacent resin by the heated band, so that the thermoplastic sheet is uniformly heated across its width and particularly in the area of the metal band contact to completely eliminate the aforesaid effects.

It has been found, for example, that an acrylonitrile-butadiene-styrene resin sheet containing small amounts of polyvinyl chloride can be softened adequately for subsequent vacuum forming by subjecting the surfaces of the resin within the furnace to radiant heat such that the surface temperature of the resin is about 310°. It has further been found that when a current of 7 to 15 amperes at a voltage of 3½ to 8 volts is impressed across the metal band between the pulleys 36 and 38 having a length of about 22 feet, no highlighting or marking-off effect is evident in the finally molded sheet material. The proper energy level of the band is empirically determined on a cut-and-try basis. This may readily be determined by varying the amperage of the electrical current in the band until molded products are achieved wihout the aforementioned undesirable effects.

The apparatus of the invention provides an efficient and convenient method of maintaining the heat energy of the band segment 35 at the appropriate levels. As stated above, substantially only the segment 35 of the band 34 which is supported on top of the pulleys 36 and 38 is subjected to the heat from the heating element 30, the heat from the synthetic resin sheet, and the environmental heat within the furnace. As the band 34 travels about the lower pulleys 40 and 42, it travels outside the furnace and in a zone in which the temperature of the space in which the apparatus is located and is accordingly cooled. However, the heat capacity of the metal band is so small that this cooling has a negligible effect on the heating system. In the instant example, when the band is heated to an optimum level, the furance exit temperature of the band 34 is about 175° F. and the heat energy may be varied within tolerable levels as reflected by band exit temperature of about 160° and 190° F. The electrical resistance heating means described thus offers a simple and efficient means for carefully controlling the temperature of the band.

The band heat energy level control system described above is particularly important because not only do different thermoplastic resin materials have different temperature characteristics with respect to the above-mentioned highlighting and mark-off effects, but different rolls of the same material from the same supplier may require a different band heat energy level for making acceptable moldings. In the above system, since the band 34 revolves around the pulleys at a constant rate, and since the ambient temperature of the space in which the apparatus is located is relatively constant for a substantial period of time, it is only necessary to slightly increase or decrease the transformer voltage and hence the amperage of the current fed through the band 34 to raise or lower the energy level therein in accordance with that needed to avoid the aforementioned highlighting or mark-off effect. The proper energy level is determined by a cut-and-try method. Once an optimum temperature has been determined for a particular type of resin sheet material, it is a simple matter to increase or lower the amperage of the current which is impressed across the band segment 35 and observe the finally molded article until a satisfactory temperature is found.

After the thermoplastic sheet 12 has passed through the furnace 10, it is then converted into molded articles by means of the vacuum forming apparatus 14. This device consists of a lower mold member 58 supported on and movable vertically by means of a hydraulic cylinder means 60 and includes a mold cavity 62 and a chamber 64 which may be evacuated through the conduit 66 and relieved through the conduit 68. A plurality of small conduits 70 extend from the chamber 64 to the mold surfaces 62.

The vacuum forming device includes an upper half 72, which is likewise supported on a hydraulic means 74 for vertical movement in a well known manner. When a portion of the softened sheet moves between the mold members 72 and 58, the sheet is stopped in its horizontal movement by stopping the movement of the pulleys 26 and the mold members are brought together, the chamber 64 is evacuated whereby the sheet material is drawn, conformed to the mold cavity 62 where the sheet material is immediately cooled by the molds so that when the mold members are opened, the sheet retains its formed configuration. Thereafter, the sheet is moved forward to position a fresh segment of the softened sheet material between the mold members. The molded article is then severed from the sheet.

Although in the preferred embodiment disclosed above, the forming means is a vacuum forming device which forms articles intermittently, it is readily apparent that any forming devices may be used including devices capable of forming continuous articles. The invention is also applicable to strictly batch methods and apparatus for vacuum forming articles from individual sheets in which a stationary support band or bands, heated to appropriate energy levels, are suitably positioned below the sheet to be heated to prevent excessive sagging and stretching of the material when in a softened condition.

I claim:

1. A method of molding articles from a synthetic resin sheet comprising the steps of
   horizontally supporting said sheet within a furnace along its edges,
   uniformly applying radiant heat to both the top and bottom surfaces of said sheet within said furnace whereby said sheet is softened to a pliable, plastic formable state and is caused to sag intermediate its edges,
   supporting the sagging portions of said sheet by means of a relatively thin metal band horizontally disposed beneath said sheet and exposed to said radiant heat, said band thereby shielding a portion of said sheet from said radiant heat,
   maintaining the heat energy in said band at a level such that said band is operative to heat said sheet portion adjacent said band sufficiently to offset the effect of said shielding to eliminate any differential heating of said sheet due to said metal band,
   and forming said softened sheet into a desired configuration.

2. A method of molding articles from a continuous synthetic resin sheet comprising the steps of
   horizontally feeding a continuous sheet of substantial width into a furnace and horizontally supporting said sheet within said furnace along its longitudinal edges,
   uniformly applying radiant heat to both the top and bottom surfaces of said sheet within said furnace whereby said sheet is softened to a pliable plastic, formable state and is caused to sag intermediate said longitudinal edges,
   supporting the sagging portions of said sheet by means of a longitudinally and horizontally disposed, relatively thin metal band exposed to said radiant heat and shielding a portion of said sheet from said radiant heat, said band being adapted to move at the same rate as said sheet,
   maintaining the heat energy in said band at a level such that said band is operative to heat said sheet portion adjacent said band sufficiently to offset the effect of said shielding to eliminate any differential heating of said sheet due to said metal band,
   and forming said softened sheet to a desired configuration.

3. A method of molding articles from a continuous resin sheet comprising the steps of
   horizontally feeding a continuous sheet of said resin of substantial width into a furnace and horizontally supporting said sheet within said furnace along each of its longitudinal edges,
   uniformly applying radiant heat to both the top and bottom surfaces of said sheet within said furnace whereby said sheet is softened to a pliable, plastic formable state and is caused to sag intermediate said longitudinal edges,
   supporting the sagging portion of said sheet by a horizontally disposed segment of an endless metal band disposed beneath said sheet within said furnace and moving at the same rate as said sheet, said sheet and said band being exposed to the radiant heat directed at the bottom surfaces of said sheet whereby said band shields a portion of said sheet from said radiant heat,
   impressing an electric current across said segment whereby said band is heated to a predetermined heat energy level whereby sufficient heat is transmitted from said band to said sheet portion to offset the effect of said band shielding said portion from said radiant heat and thereby prevent any substantial differential heating of said sheet into the vicinity of said band which would mar the appearance of said sheet,
   and forming said softened sheet to a desired configuration.

4. Apparatus for heat softening thermoplastic sheet material for molding articles therefrom comprising a furnace,
   means for supporting said sheet material in said furnace in a horizontal plane at its edges,
   radiant heating means disposed above and below said plane for subjecting both top and bottom surface of said sheet material to radiant heat,
   a thin narrow metal band disposed horizontally below said plane adapted for supporting the sagging portions of said sheet material when it has been heat softened, and
   electrical circuit means connected in series with said band for resistance heating said band to a predetermined temperature level.

5. In apparatus for heat softening thermoplastic resin sheet material for molding articles therefrom including a horizontally disposed furnace, means for feeding said sheet material through said furnace and for movably supporting said sheet therein in a horizontal plane, and radiant heating means above and below said plane for subjecting both the top and bottom surfaces of said sheet to radiant heat, the improvement comprising an endless metal band disposed below said plane, a portion of said band being disposed horizontally and longitudinally of said sheet supporting means near to said plane, two longitudinally spaced and electrically insulated pulleys carrying said portion within said furnace, electrical connection means for connecting said pulleys within said furnace in series electrical circuit for impressing an electrical current across said portion, and means for moving said band on said pulleys at a linear rate equal to the linear rate of travel of said supporting means, said electrical current being operative to heat said portion to a predetermined heat energy level within said furnace.

6. The apparatus of claim 5 wherein said electrical connection means comprises a brush contact associated with each of said pulleys within said furnace whereby said brush contact slidably engages a pulley as it rotates.

References Cited

UNITED STATES PATENTS 3,264,157   8/1966   Lattimer _____ 264—92

OTHER REFERENCES

A. S. Matthews and G. Hulse, "The Vacuum Forming of Biaxially Oriented Polystyrene," British Plastics, October 1960, pages 463–467.

ROBERT F. WHITE, Primary Examiner

R. SHEAR, Assistant Examiner

U.S. Cl. X.R.

18—4; 219—388; 263—3; 264—92